US012632985B2

(12) United States Patent
Cascetta et al.

(10) Patent No.: US 12,632,985 B2
(45) Date of Patent: May 19, 2026

(54) INTERPUPILLARY DISTANCE ESTIMATION METHOD

(71) Applicant: LUXOTTICA GROUP S.P.A., Milan (IT)

(72) Inventors: Cristian Cascetta, Milan (IT); Luca Mazzocchi, Legnano (IT); Fabio Mazzarella, Busto Arsizio (IT)

(73) Assignee: LUXOTTICA GROUP S.P.A., Milan (IT)

( * ) Notice: Subject to any disclaimer, the term of this patent is extended or adjusted under 35 U.S.C. 154(b) by 426 days.

(21) Appl. No.: 18/300,463

(22) Filed: Apr. 14, 2023

(65) Prior Publication Data

US 2023/0342976 A1     Oct. 26, 2023

(30) Foreign Application Priority Data

Apr. 22, 2022    (IT) ......................... 102022000008099

(51) Int. Cl.
| | |
|---|---|
| *G06T 7/73* | (2017.01) |
| *G06T 7/30* | (2017.01) |
| *G06T 7/60* | (2017.01) |

(52) U.S. Cl.
CPC .................. *G06T 7/74* (2017.01); *G06T 7/30* (2017.01); *G06T 7/60* (2013.01);
(Continued)

(58) Field of Classification Search
CPC ........... A61B 3/111; G06T 2207/10028; G06T 2207/30041; G06T 2207/30204;
(Continued)

(56) References Cited

U.S. PATENT DOCUMENTS

| | | |
|---|---|---|
| 9,265,414 B2 | 2/2016 | Wilson et al. |
| 10,521,661 B2 * | 12/2019 | Chen .................... G06F 18/2155 |

(Continued)

FOREIGN PATENT DOCUMENTS

CN        112220444 A      1/2021

OTHER PUBLICATIONS

Bekerman, Inessa et al. "Variations in eyeball diameters of the healthy adults." Journal of ophthalmology vol. 2014 (2014): 503645. doi: 10.1155/2014/503645 (Year: 2014).*
(Continued)

*Primary Examiner* — Chineyere Wills-Burns
*Assistant Examiner* — Emmanuel Silva-Avina
(74) *Attorney, Agent, or Firm* — CANTOR COLBURN LLP

(57)        ABSTRACT

A system performs an interpupillary distance estimation method, which includes capturing a plurality of depth images of a user's face where each depth image comprises a 2D image and a 2D map of data representative of the distances of each pixel from an observation point. For each of the captured depth images, the system processes the captured depth image by correcting the alignment between the 2D map of data and the 2D image, locates two first marker points corresponding to the pupils on the 2D image, and obtains the spatial coordinates in metric units of the first marker points from the 2D data map. The system further determines an initial estimate of the interpupillary distance by calculating the distance between the first marker points, determines a second estimate of the interpupillary distance, and calculates the final estimate of the interpupillary distance based on the first estimates or the second estimates.

14 Claims, 5 Drawing Sheets

(ARTE NOTA)

(52) U.S. Cl.
CPC ............... *G06T 2207/10028* (2013.01); *G06T 2207/30041* (2013.01); *G06T 2207/30204* (2013.01)

(58) Field of Classification Search
CPC ... G06T 7/60; G06T 2207/10024; G06T 7/30; G06T 7/74; G06T 7/33
USPC ........................................................ 382/103
See application file for complete search history.

(56) References Cited

U.S. PATENT DOCUMENTS

| | | | |
|---|---|---|---|
| 11,379,957 B1 * | 7/2022 | Chandrasekhar | ......... G06T 7/62 |
| 11,607,124 B2 * | 3/2023 | Zhang | .................... A61B 3/145 |
| 2014/0218680 A1 * | 8/2014 | Wilson | ................ G02C 13/005 |
| | | | 351/204 |
| 2017/0199394 A1 * | 7/2017 | Gorrotxategi Salaberria | .............. |
| | | | G02C 7/068 |
| 2017/0344110 A1 * | 11/2017 | Yoshioka | ............. G06V 40/193 |
| 2018/0018516 A1 * | 1/2018 | Odinokikh | ........... G06V 40/193 |
| 2021/0393121 A1 * | 12/2021 | Goldberg | ................ G06T 17/20 |
| 2022/0286658 A1 * | 9/2022 | Tan | ......................... G06V 40/18 |
| 2023/0103129 A1 * | 3/2023 | Morrell | ..................... G06T 7/55 |
| | | | 382/206 |

OTHER PUBLICATIONS

Li, Sen. "Per-pixel calibration for rgb-depth natural 3d reconstruction on gpu." (2016). (Year: 2016).*
Search Report with Opinion issued in Italian Patent Application No. 102022000008099; Application Filing Date Apr. 22, 2022; Date of Mailing Nov. 30, 2022 (8 pages).

* cited by examiner

Fig. 4   (ARTE NOTA)

INTERPUPILLARY DISTANCE ESTIMATION METHOD

CROSS-REFERENCE TO RELATED APPLICATIONS

This application claims the benefit of Italian Application Serial No. 102022000008099 filed on Apr. 22, 2022, the disclosure of which is incorporated herein by reference in its entirety.

BACKGROUND

The present disclosure refers to an interpupillary distance estimation method using terminals such as smartphones, laptops and so on.

The interpupillary distance or IPD is a fundamental quantity for the choice and configuration of glasses.

Generally, when buying glasses at the shop, the optician draws two points on the test lenses at the estimated position of the pupils by eye; the distance between the two drawn points is considered the interpupillary distance of the user. Recently, computer programs or software have been developed that can estimate the interpupillary distance of a user through the analysis of a captured digital image of the user's face. This software is loaded on specific terminals installed in the shops.

SUMMARY

One or more non-limiting embodiments described herein provides a electronic computer, which performs an interpupillary distance estimation method. When performing the method, the electronic computer captures a plurality of depth images of a user's face where each depth image comprises a 2D image and a 2D map of data representative of the distances of each pixel from an observation point. For each of the captured depth images, the electronic computer processes the captured depth image by correcting the alignment between the 2D map of data and the 2D image, locates two first marker points corresponding to the pupils on the 2D image, and obtains the spatial coordinates in metric units of the first marker points from the 2D data map. The electronic computer further determines an initial estimate of the interpupillary distance by calculating the distance between the first marker points, determines a second estimate of the interpupillary distance, and calculates the final estimate of the interpupillary distance based on the first estimates or the second estimates.

BRIEF DESCRIPTION OF THE DRAWINGS

The features and advantages of an interpupillary distance estimation method according to the present disclosure will become more apparent from the following description, by way of example and not limitation, referring to the accompanying schematic drawings in which.

DETAILED DESCRIPTION

Figure 1:
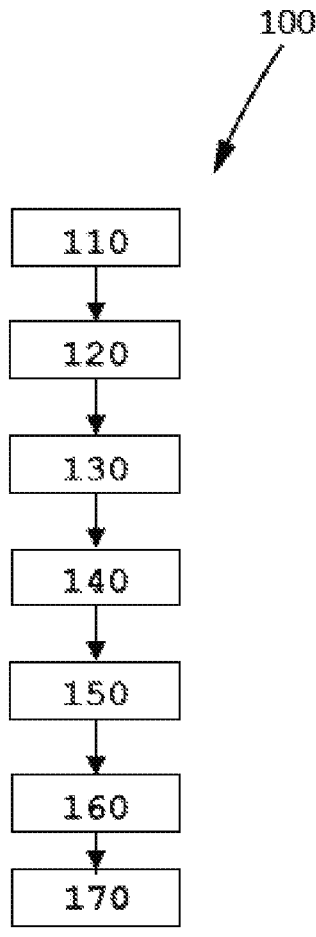
FIG. 1 is a flowchart depicting an interpupillary distance estimation method according to a first embodiment of the present disclosure.
Figure 2:
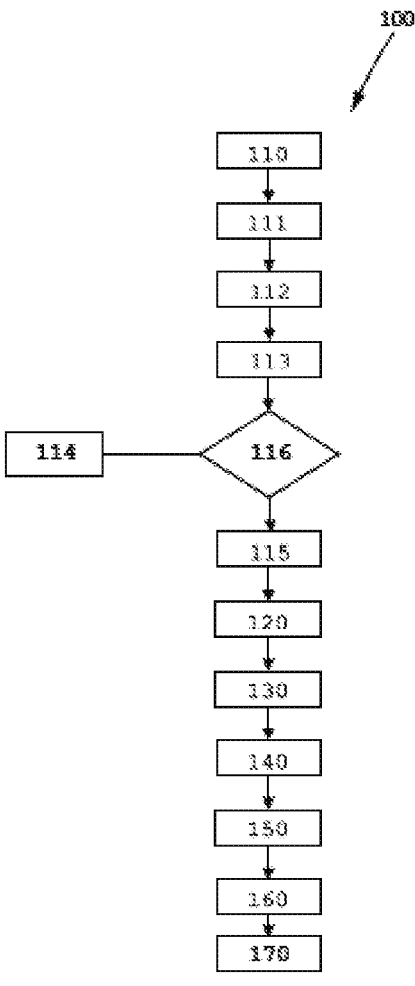
FIG. 2 is a flowchart depicting an interpupillary distance estimation method according to a second embodiment of the present disclosure.
Figure 3:
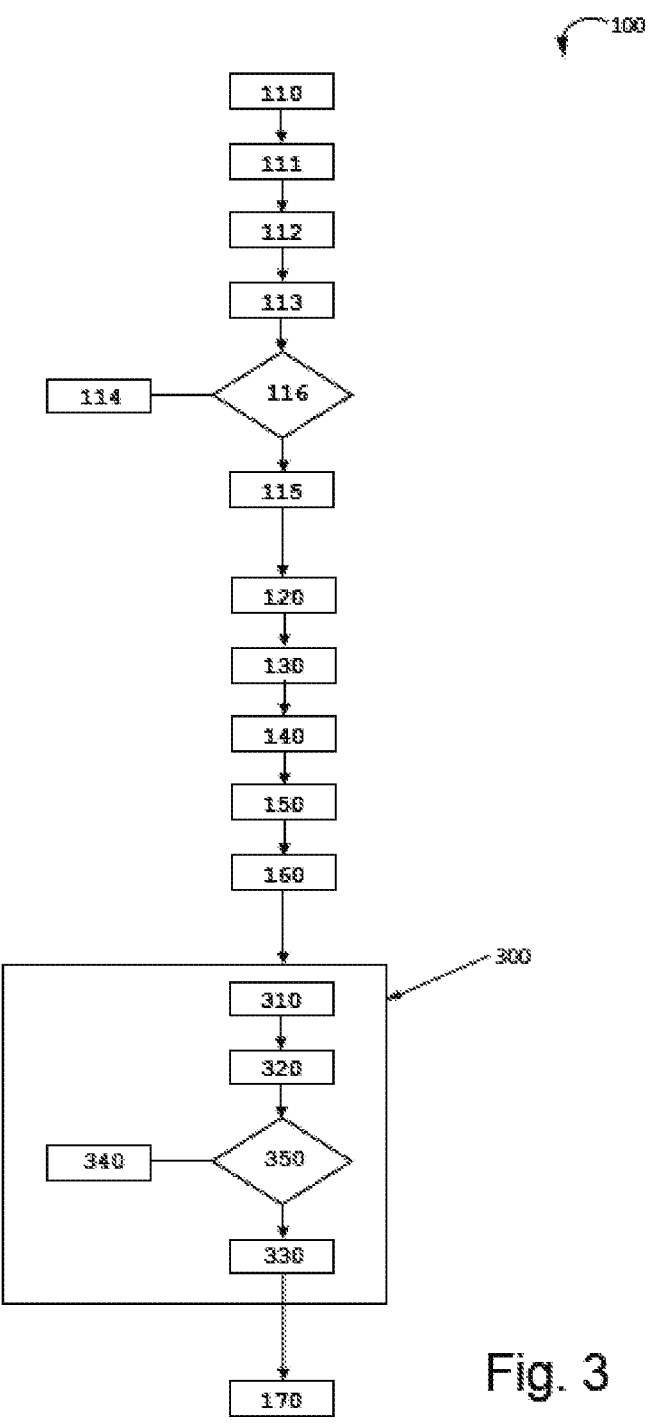
FIG. 3 is a flowchart depicting an interpupillary distance estimation method according to a third embodiment of the present disclosure
Figure 4:
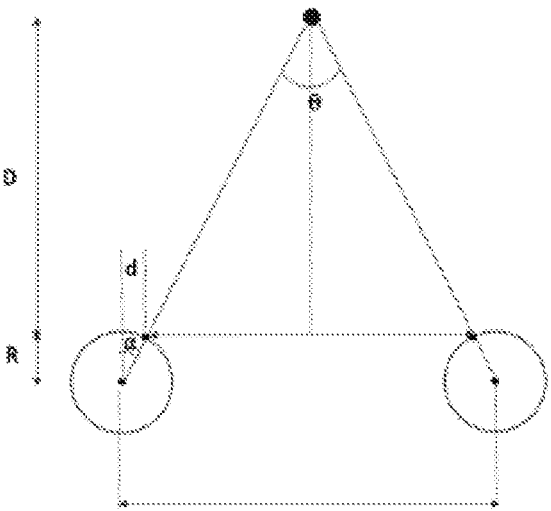
FIG. 4 is a representative diagram of two pupils seen from an observation point coincident with the position of a camera.

In recent years, however, with the growth of e-commerce, i.e. the sale of online products on the internet network, it has become necessary to have software for estimating the interpupillary distance installed on mobile terminals or desktop personal computers (PCs) of the users and integrated into online sales software applications.

The presence of cameras integrated in mobile terminals or cameras connected to desktop computers facilitate the immediate capture of the digital images that the software needs to estimate the interpupillary distance.

Interpupillary distance estimation methods implemented through software for terminals that use the so-called range-imaging techniques are known. These techniques are used to produce a two-dimensional or 2D image in which each pixel is associated with a respective value of the distance of the point represented by the pixel from the point of observation and capture of the image. Such techniques envisage capturing or acquiring the image by means of a depth image capture system. Such a depth image capture system may comprise a stereo vision system or a so-called depth camera. In the case in which the depth image capture system is properly calibrated the values of the distances associated with the pixels can be determined directly in real metric units such as metres.

In any case, the depth image capture system is configured to capture a two-dimensional image, determine a two-dimensional map of data representative of the distances of each pixel from an observation point, and associate the two-dimensional map with the captured two-dimensional image such that each pixel of the captured two-dimensional image is associated with a datum of the two-dimensional map. This association is performed by means of synchronization algorithms.

Nowadays more and more terminals, such as smartphones, tablets and so on, are equipped with depth cameras to out measurements carry in numerous application contexts, for example in the building sector or in the eyewear sector.

The interpupillary distance estimation methods based on range imaging techniques comprise the steps of:

capturing, by means of a depth camera of an electronic terminal, a depth image of a user's face comprising a two-dimensional or 2D image and a two-dimensional map of data representative of the distances of each pixel from an observation point coincident with the position of said depth camera, said two-dimensional map being aligned with said two-dimensional or 2D image in such a way that each pixel of the captured two-dimensional image is associated with a datum of the two-dimensional map;

performing a processing of said captured depth image in such a way as to correct intrinsic optical alterations;

detecting on the 2D image two marker points corresponding to the pupils;

obtaining the spatial coordinates in metric units of said marker points;

determining the estimate of the interpupillary distance expressed in metric units by calculating the distance between said marker points.

Depth image processing means a process that envisages finding the distortion coefficients of the camera, as provided by the manufacturer, and the subsequent processing of the image on the basis of such distortion coefficients.

Interpupillary distance estimation method based on range imaging techniques in which the position of the pupils is determined through iterative refining processes with consequent increase in computational burden are also known.

The interpupillary distance estimation method based on range imaging techniques has the advantage that the data are already detected in metric units and it therefore does not need, in order to be implemented, to show any objects of known dimensions in order to be able to calculate a pixel-millimetre conversion ratio; this method, therefore, is very simple for the user to implement.

The known interpupillary distance estimation method described above has some drawbacks.

One drawback is that depth cameras are very expensive and therefore such a method can only be implemented in very expensive terminals.

Another drawback is that the precision of the measurement depends on the precision of the depth sensor of the depth camera suitable for detecting the two-dimensional map of data as well as on the resolution and sensitivity of the 2D image capture sensor. A further drawback is that the accuracy of the estimate also depends on the pose and gaze direction of the user, the light and focus conditions with which the two-dimensional image is captured; in this regard it should be pointed out that the ideal environmental conditions for the operation of the depth sensor can be conflicting with those of the two-dimensional image capture sensor.

In addition, the accuracy of the estimate also depends on the accuracy that can be achieved with the particular processing process that can be employed.

The object of the present disclosure is to obviate the above-mentioned drawbacks and in particular to devise an interpupillary distance estimation method based on range-imaging techniques that is more accurate than the methods of the prior art independently of the precision of the depth camera avoiding a step of refining the position of the pupils with reduction of computational calculation burdens.

This and other objects according to the present disclosure are achieved by realizing an interpupillary distance estimation method as described herein.

A further object of the present disclosure is to obviate the aforementioned drawbacks and in particular to devise a computer program loadable into a memory of an electronic computer and comprising instructions leading the electronic computer to implement an interpupillary distance estimation method that is simpler than those based on the recognition of an object or sign with known dimensions in the captured digital image of the user's face.

This further object according to the present disclosure is achieved by realizing a computer program stored in memory of an electronic computer installed on an electronic device or computer system as described herein.

Further features of the interpupillary distance estimation method are are provided according to one or more non-limiting embodiments described herein.

With reference now to the figures, an interpupillary distance estimation method is shown, indicated overall with 100.

Such an interpupillary distance estimation method 100 is implementable by an electronic computer equipped with a memory for data storage. The electronic computer and memory can be implemented in a electronic system or device such as, for example, a mobile terminal (e.g., smart phone, computer tablet, laptop computer, etc.). An example of a electronic device implementing an electronic computer (e.g., a hardware controller), memory, a display, and memory is illustrated, for example, in FIG. 5. In particular, the interpupillary distance estimation method 100 is implementable by an interpupillary distance estimation program or software loaded into the computer memory.

This interpupillary distance estimation program therefore comprises instructions leading the electronic computer to implement the interpupillary distance estimation method 100 when the electronic computer executes the program.

The interpupillary distance estimation program can be associated with an e-commerce eyewear platform. In this case, the interpupillary distance estimation program is executed whenever a user buys glasses on the e-commerce eyewear platform.

More generally the interpupillary distance estimation program can also be executed by an operator's electronic device (e.g., mobile terminal) after a user has bought a pair of glasses.

An electronic device as described herein can including, but is not limited to, a desktop personal computer, mobile terminal, a smartphone, a tablet, a laptop computer, a handheld electronic device, a smart wearable device, and so on.

The electronic terminal comprises a depth camera and an electronic computer equipped with a memory for data storage into which a program or software for estimating the interpupillary distance according to the present disclosure is loaded.

The interpupillary distance estimation method 100 according to the present disclosure comprises the steps of:

capturing 110, by means of a depth camera, a plurality of depth images of a user's face where each depth image comprises a two-dimensional or 2D image and a two-dimensional map of data representative of the distances of each pixel from an observation point coincident with the position of said depth camera, said two-dimensional map being aligned with said two-dimensional or 2D image in such a way that each pixel of the captured two-dimensional image is associated with a datum of the two-dimensional map;

and for each of said captured depth images:

performing 120 a processing of said captured depth image by correcting the alignment between said two-dimensional map of data and said two-dimensional or 2D image;

locating 130 two marker points corresponding to the pupils on the two-dimensional or 2D image;

obtaining 140 the spatial coordinates in metric units of said marker points from said two-dimensional map of data;

determining 150 an initial estimate of the interpupillary distance by calculating the distance between said marker points;

determining 160 a second estimate of the interpupillary distance;

calculating 170 a final estimate of the interpupillary distance based on the first estimates and/or the second estimates.

Preferably the first estimate of the interpupillary distance corresponds to the estimate of the near interpupillary distance and is expressed in metric units.

Preferably the second estimate of the interpupillary distance corresponds to the estimate of the far interpupillary distance, is expressed in metric units and is calculated on the basis of the first estimate and a predetermined eyeball radius set to be equal to the value of the eyeball radius most widespread among the global population according to the data contained in an anthropometric database. An anthropometric database is a state-of-the-art database that provides anthropometric data. The anthropometric data are data on the dimensions and shape of the human body and are the basis on which all digital human models are built. An anthropometric database contains data relative to anthropometric measurements, i.e. the measurements of the human body such as height, weight, eyeball radius etc., of a plurality of people.

The best-known freely accessible databases are, by way of example, ANSUR™ I and ANSUR™ II and NHANES™.

Alternatively, the first estimate of the interpupillary distance corresponds to the estimate of far interpupillary distance and is expressed in metric units, while the second estimate of the interpupillary distance corresponds to the estimate of near interpupillary distance, is expressed in metric units and is calculated on the basis of the first estimate and a predetermined eyeball radius set to be equal to the value of the eyeball radius most widespread among the global population according to the data contained in an anthropometric database. In this case the step of capturing 110 the plurality of depth images is performed by asking the user to look towards a very far point.

Depth image processing means a process that envisages finding the distortion coefficients of the camera, as provided by the manufacturer, the subsequent processing of the image on the basis of those distortion coefficients.

The step of capturing 110 a plurality of depth images is, in particular, performed by taking a photograph by means of a depth camera or a camera system of a mobile terminal or a desktop PC adapted to operate as a depth camera. Depth images can be captured by asking the user to look closely towards the depth camera or to look towards a far point beyond the camera.

In the following discussion, reference will be made for simplicity's sake to the case where the depth images are captured by asking the user to look closely towards the depth camera. The description can then be applied mutatis mutandis to the case where the images are captured by asking the user to look towards a far point beyond the camera.

The step of locating 130 the marker points corresponding to the pupils is performed by means of a first algorithm. For example, the first algorithm may be a digital image processing algorithm or a machine-learning algorithm that will not be described in detail as they are known in the state of the art.

For example, in the case in which the first algorithm is of the digital image processing type, it detects and locates the marker points corresponding to the pupils based on the detection of colours and geometric characteristics of the image. Conversely, in the case in which the first algorithm is of the machine-learning type, it detects and locates the marker points corresponding to the pupils based on a calculation model trained on a set of images in which the position of these points is already known.

Once the marker points corresponding to the pupils are located on the two-dimensional or 2D image, the respective spatial coordinates of the same are obtained by projecting said marker points on the two-dimensional map of the relative depth image in a manner known per se in the state of the art.

After obtaining the spatial coordinates of the marker points, the distance thereof is calculated, by applying the deprojection techniques known in the state of the art, thus obtaining a first estimate of the interpupillary distance corresponding to the estimate of near interpupillary distance IPDD.

Near interpupillary distance IPDD means the distance between the two pupils of a user when the user looks at a near point.

The step of determining the second interpupillary distance estimate corresponding to the estimate of far interpupillary distance IPD∞ is performed by means of a second trigonometric calculation algorithm.

Far interpupillary distance IPD∞ means the distance between the two pupils of a user when the user looks at a very far point.

This second algorithm first calculates the angle θ between the two segments that join the marker points to the observation point solving the following expression in a simplified form:

$$\theta = 2\tan^{-1}\frac{IPD_D}{2D}$$

where D is the distance between the observation point and the segment that joins the marker points.

The marker points and the observation point define an isosceles triangle with vertex angle θ, height D and base equal to the segment that joins the marker points.

Thus the angle α=θ/2 between the radius joining the centre of the pupils and one of the marker points and the radius of the eyeball parallel to the height D are calculated.

Preferably, the radius of the predetermined eyeball R is set to be equal to the value of the eyeball radius most widespread among the global population according to data contained in an anthropometric database.

Since the radius of the eyeball is known, the distance d between the marker point and the centre of the pupil along the direction parallel to the segment joining the marker points is calculated by the expression: d=R sin α.

Finally, the second estimate of the interpupillary distance is determined by the expression: IPD∞=IPDD+2d.

Once the second estimate of the interpupillary distance has been calculated for all the depth images captured, the final estimate of the interpupillary distance is calculated 170 based on the first estimates or the second estimates.

Preferably, the final estimate is calculated in the calculation step 170 through an aggregation function of the first estimates or the second estimates.

Preferably, the final estimate is calculated in the calculation step 170 as the average value of the first estimates or the second estimates.

Preferably, the interpupillary distance estimation method 100 comprises, prior to the calculation step of the final estimate, a filtering step 300 in which for each depth image captured it is evaluated whether the respective two-dimensional or 2D image is reliable or unreliable by comparing one or more characterizing parameters of the image itself with respective reliability thresholds; if the two-dimensional or 2D image is unreliable, the relative depth image (also considered unreliable) is excluded from the calculation step of the third estimate.

The interpupillary distance estimation method 100, according to the present disclosure, does not envisage a step of refining the positions of the pupils, but guarantees a high accuracy of the estimate thereof by first eliminating the captured depth images considered as unreliable, i.e. those that would probably entail incorrect estimates of the positions of the pupils and therefore the introduction of errors.

Preferably, the characterizing parameters of the captured image comprise a ratio representative of the degree of eyelid opening, where such ratio is called "eye aspect ratio".

In such a case, the filtering step 300 comprises for each depth image captured, the steps:

locating 310, on the respective two-dimensional or 2D image, a plurality of marker points corresponding to specific features of a user's face comprising at least the eyelids; other features of the face may be for example nose, mouth, eyebrows and so on;

determining 320 the ratio representative of the degree of opening of the eyelids called the eye aspect ratio;

comparing 350 the eye aspect ratio with a predetermined threshold value of image reliability;

if the eye aspect ratio is greater than said predetermined threshold value of image reliability, considering the two-dimensional or 2D image as reliable 330;

if the eye aspect ratio is lower than the predetermined threshold value of image reliability, considering the two-dimensional or 2D image as unreliable 340.

For example, the predetermined threshold value is set on the basis of historical data; in particular, considering a certain number of previously captured and stored historical images, the aforementioned threshold can be determined by calculating the average value of the eye aspect ratio of all images considered as reliable, that is, those images for which the first algorithm was able to correctly detect the position of the pupils.

The localization 310 of the marker points is performed by means of a third machine-learning algorithm.

In addition to or as an alternative to the eye aspect ratio, the characterizing parameters of the captured image comprise a plurality of data from the inertial sensors of the phone or other device equipped with a depth camera (e.g. acceleration, position, etc.), the direction of the user's gaze, the image quality parameters (e.g. brightness, contrast, sharpness, etc.).

Preferably, a respective reliability level is determined for each individual image deemed reliable, representing the degree of reliability of the image itself; for example, the higher this level, the more reliable the image is.

Preferably, the final estimate is calculated in the calculation step 170 as the average value of the first estimates or the second estimates for all reliable two-dimensional or 2D images.

More preferably, the final estimate is calculated in the calculation step 170 as the average value of the first estimates or the second estimates for all reliable two-dimensional or 2D images weighed according to the reliability level of those images.

Preferably, the step of capturing 110 at least one 2D image comprises a step of "nudging" or supporting the user to perform the image capture under optimal image capture or photography conditions.

This step of supporting the user comprises one or more of the following detections:

detecting 111 the presence of glasses on the user's face;

detecting 112 a plurality of photographic parameters necessary to infer the quality of the input image;

detecting 113 a non-visible portion of the face, for example due to possible occlusions.

The photographic parameters are, for example, light exposure, focus, aperture, and so on. The uniformity of the face illumination is another qualitative component that is very relevant for ensuring the quality of the input image. The detection of the photographic parameters takes place by means of a digital image processing algorithm in a way that is per se known.

In this case, the step of supporting the user towards conditions for taking in an optimal manner the visual data also comprises the steps:

evaluating 116 the detections 111, 112, 113;

notifying 114 the user to remove the glasses after the detection of the presence of glasses on the user's face and/or to modify the relative positioning between the camera and the face after the detection of at least one photographic parameter outside a respective range of acceptability threshold values or of a non-visible portion of the face;

taking 115 the photograph if the presence of the glasses is not detected and no photographic parameter outside a respective range of acceptability threshold values and no non-visible portion of the face are detected.

Notification 114 to the user can take place in various ways, for example with a text message on a display of the electronic device or terminal screen or with a light indication of the traffic lights type where red indicates a non-optimal capture condition and green indicates an optimal capture condition.

The detection of the presence of the glasses on the user's face 111 and the detection of a non-visible portion are preferably performed by means of a fourth machine-learning algorithm.

Said fourth machine-learning algorithm can preferably be based on a convolution neural network or CNN trained to detect the presence/non-presence of glasses and the presence/non-presence of non-visible portions of the face. The training of the fourth algorithm is performed with a set of images in which the presence/non-presence of non-visible portions of the face are already known.

From the description made, the features of the interpupillary distance estimation method object of the present disclosure are clear, as are the relative advantages.

In fact, in the case where the images are captured by asking the user to look closely towards the camera, the method according to the present disclosure makes it possible to obtain an accurate estimate of the interpupillary distance on the basis of a plurality of depth images by compensating for the estimate error deriving from the proximity of the observation point or image capture to the user's face and by calculating the average value of the estimates calculated for each of said images.

In the event that the filtering step is envisaged, the estimation method is even more accurate since the captured images considered as unreliable are excluded if the eyelids are not sufficiently open to allow a reliable localization of the pupils.

The step of supporting the user towards optimal image capture or photography conditions ensures the capture of depth images that are as suitable as possible to provide reliable estimates.

This step of supporting the user is performed automatically, simplifying the end-user experience, minimising the user effort and avoiding the need for any tool other than the terminal.

Finally, it is clear that the estimation method thus conceived is susceptible of numerous modifications and variations, all of which are within the scope of the disclosure. In addition, all the details can be replaced by technically equivalent elements. In practice, the materials used, as well as their dimensions, can be of any type according to the technical requirements.

Figure 5:
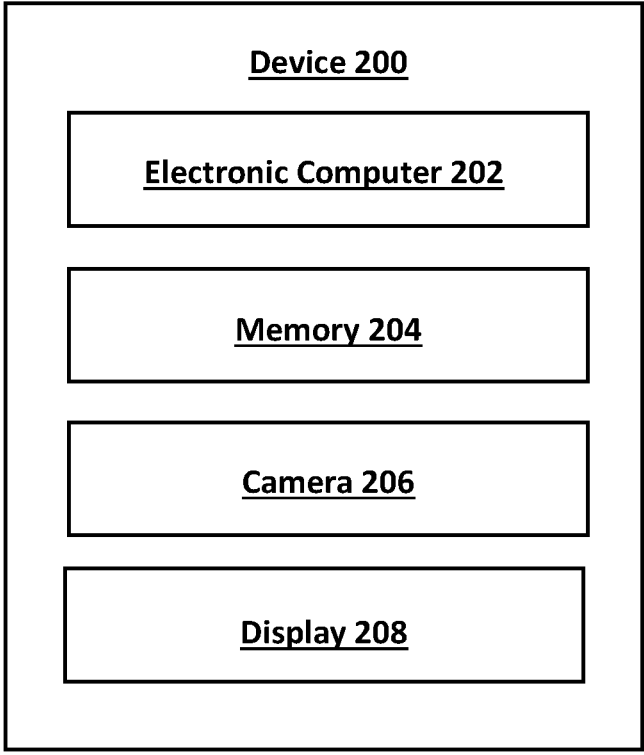
FIG. 5 is a block diagram illustrating an electronic device configured to perform an interpupillary distance estimation method according to a non-limiting embodiment of the present disclosure.

Turning now to FIG. 5, an electronic device 200 configured to perform an interpupillary distance estimation method is illustrated according to a non-limiting embodiment of the present disclosure. As described herein, the electronic device 200 can include, but is not limited to, a desktop personal computer, a mobile terminal, a smartphone, a tablet computer, a laptop computer, a handheld electronic device, a smart wearable device, and so on.

The electronic device 200 includes an electronic computer 202, memory 204, a camera 206, and a display screen 208. In one example, the device 200 may be communicatively coupled to a database (not shown. In one embodiment, the database may be internal to device 200. In one embodiment, the database may be external to device 200. In some embodiments, portions of database may be both internal and external to device. In one or more non-limiting embodiments the database includes the anthropometric database, as described herein.

The electronic computer 202 can perform interpupillary distance estimation method, e.g., by processing executable instructions stored in the memory 204. The camera 206 can be implemented as a depth camera, for example, which is capable of capturing a plurality of depth images of a user's face. According to one or more non-limiting embodiments, each of the depth images comprises a two-dimensional or 2D image and a two-dimensional map of data representative of the distances of each pixel from an observation point coincident with the position of said depth camera, and each of the depth images includes a two-dimensional map being aligned with the two-dimensional or 2D image in such a way that each pixel of the captured two-dimensional image is associated with a datum of the two-dimensional map. The display screen 208 can display various notifications. For example, a notification 114 to the user can take place in various ways, for example with a text message on a display of the electronic device or terminal screen or with a light indication of the traffic lights type where red indicates a non-optimal capture condition and green indicates an optimal capture condition.

As described herein a system, device and/or an electronic computer) is provided, which performs an interpupillary distance estimation method. When performing the method, the system captures a plurality of depth images of a user's face where each depth image comprises a 2D image and a 2D map of data representative of the distances of each pixel from an observation point. For each of the captured depth images, the system processes the captured depth image by correcting the alignment between the 2D map of data and the 2D image, locates two first marker points corresponding to the pupils on the 2D image, and obtains the spatial coordinates in metric units of the first marker points from the 2D data map. The system further determines an initial estimate of the interpupillary distance by calculating the distance between the first marker points, determines a second estimate of the interpupillary distance, and calculates the final estimate of the interpupillary distance based on the first estimates or the second estimates.

The invention claimed is:

1. Interpupillary distance estimation method implementable by an electronic computer equipped with a memory for data storage, said interpupillary distance estimation method comprising the following steps:

capturing, by a depth camera, a plurality of depth images of a user's face wherein each of said depth images comprises a two-dimensional or 2D image and a two-dimensional map of data representative of the distances of each pixel from an observation point coincident with the position of said depth camera, said two-dimensional map being aligned with said two-dimensional or 2D image such that each pixel of the captured two-dimensional image is associated with a datum of the two-dimensional map, thereby providing a per-pixel aligned 2D image and depth map;

for each of said captured depth images:

performing a processing of said captured depth image by correcting the alignment between said two-dimensional map of data and said two-dimensional or 2D image;

locating two first marker points corresponding to the pupils on the two-dimensional (2D) image;

obtaining the spatial coordinates in metric units of said first marker points by retrieving the corresponding datum of said two-dimensional map associated with pixel positions corresponding to said first marker points;

determining a first estimate of the interpupillary distance by calculating the distance between said first marker points, wherein said first estimate of interpupillary distance corresponds to the estimate of near interpupillary distance and is expressed in metric units;

determining a second estimate of the interpupillary distance, wherein said second estimate of interpupillary distance corresponds to the estimate of far interpupillary distance, is expressed in metric units, and is calculated on the basis of said first estimate and an eyeball radius corresponding to the pupils on the 2D image;

a filtering step in which, for each depth image captured, it is evaluated whether the respective two-dimensional or 2D image is reliable or unreliable by comparing one or more characterizing parameters of the image with respective reliability thresholds; if the depth image captured is evaluated to be unreliable, the depth image is excluded from a final estimate;

calculating the final estimate of interpupillary distance based on said first estimates or said second estimates, wherein said characterizing parameters of the captured image comprise a ratio representative of the degree of opening of the eyelids, this ratio being referred to as the "eye aspect ratio", said filtering step comprising, for each depth image captured, the following steps:

locating, on the respective two-dimensional or 2D image, a plurality of second marker points corresponding to specific features of a user's face comprising at least the eyelids;

determining said ratio representative of the degree of opening of the eyelids called the eye aspect ratio;

comparing the eye aspect ratio with a predetermined threshold value of image reliability;

if the eye aspect ratio is greater than the threshold value of image reliability, considering the two-dimensional or 2D image and the corresponding depth image as reliable;

if the eye aspect ratio is lower than the threshold value of image reliability, considering the two-dimensional or 2D image and the corresponding depth image as unreliable, and wherein determining the second estimate of interpupillary distance corresponding to the estimate of far interpupillary distance is performed using a second trigonometric calculation algorithm, and wherein said step of locating said second marker points is performed using a third machine-learning algorithm.

2. Interpupillary distance estimation method according to claim 1, wherein the eyeball radius corresponding to the pupils on the 2D image is a predetermined eyeball radius set to be equal to the value of the eyeball radius most widespread among the global population according to data contained in an anthropometric database.

3. Interpupillary distance estimation method according to claim 2, wherein the final estimate is calculated in the calculation step through an aggregation function of the first estimates or the second estimates.

4. Interpupillary distance estimation method according to claim 2, wherein the final estimate is calculated in the calculation step as the average value of the first estimates or the second estimates.

5. Interpupillary distance estimation method according to claim 1, wherein said step of locating said first marker points is performed by a first digital image processing algorithm or a first machine-learning algorithm trained on a set of images in which the position of said points is already known.

6. Interpupillary distance estimation method according to claim 1, wherein the one or more characterizing parameters of the captured image comprise a plurality of data from inertial sensors of a phone or other device equipped with a depth camera.

7. Interpupillary distance estimation method according to claim 1, wherein the one or more characterizing parameters of the captured image comprise image quality parameters.

8. Interpupillary distance estimation method according to claim 1, wherein the final estimate is calculated in the calculation step as an average value of the first estimates or second estimates for all the two-dimensional or 2D images deemed reliable.

9. Interpupillary distance estimation method according to claim 1, wherein a respective reliability level is determined for each individual image deemed reliable, representing degree of reliability of the image itself.

10. Interpupillary distance estimation method according to claim 9, wherein the final estimate is calculated in the calculation step as the average value of the first estimates or second estimates for all two-dimensional or 2D images deemed reliable weighted according to the reliability level of those images.

11. Interpupillary distance estimation method according to claim 1, wherein the step of capturing at least one depth image comprises a step of supporting the user towards optimal image capture or photography conditions, said user support step comprising one or more of the following detections:

detecting the presence of glasses on the user's face;

detecting a plurality of photographic parameters necessary to infer the quality of the captured image;

detecting a portion of the face that is not visible, said user support step also comprising the following steps:

evaluating said detections;

notifying the user to remove glasses following the detection of the presence of glasses on the user's face and/or to change the relative positioning between the camera and the face following the detection of at least one photographic parameter outside a respective range of acceptability threshold values or a portion of the face that is not visible and repeating the detection steps;

taking the photograph if the presence of glasses is not detected and no photographic parameter outside a respective range of acceptability threshold values is detected and no non-visible portion of the face is detected.

12. Interpupillary distance estimation method according to claim 11, wherein the detection of the presence of glasses on the user's face and the detection of a non-visible portion are performed by a fourth algorithm trained with a set of images in which the presence/non-presence of glasses and the presence/non-presence of non-visible portions of the face are already known.

13. The electronic computer according to claim 1 further comprises a computer program stored on the memory of an electronic computer and comprising instructions that cause the electronic computer to:

control a depth camera to capture a plurality of depth images of a user's face wherein each of said depth images comprises a two-dimensional or 2D image and a two-dimensional map of data representative of the distances of each pixel from an observation point coincident with the position of said depth camera, said two-dimensional map being aligned with said two-dimensional or 2D image in such a way that each pixel of the captured two-dimensional image is associated with a datum of the two-dimensional map; and to perform the interpupillary distance estimation method based on each of said captured depth images according to claim 1 when the electronic computer executes the instructions of the program.

14. Electronic computer according to claim 13, further includes an electronic terminal comprising a depth camera.

* * * * *